Patented Apr. 27, 1926.

1,582,408

UNITED STATES PATENT OFFICE.

DAVID A. LEGG, OF TERRE HAUTE, INDIANA, ASSIGNOR TO COMMERCIAL SOLVENTS CORPORATION, OF TERRE HAUTE, INDIANA, A CORPORATION OF MARYLAND.

PROCESS FOR THE PRODUCTION OF BUTYL ALCOHOL AND ACETONE.

No Drawing. Application filed March 30, 1925. Serial No. 19,498.

*To all whom it may concern:*

Be it known that I, DAVID A. LEGG, a subject of the King of Great Britain, residing in Terre Haute, in the county of Vigo and State of Indiana, have invented a certain new and useful Process for the Production of Butyl Alcohol and Acetone, of which the following is a specification.

My invention relates to the production of butyl alcohol and acetone by the fermentation of carbohydrate materials free from or deficient in protein, by means of certain bacilli, and relates more specifically to a novel process for the fermentation of carbohydrates of a saccharine nature; such as glucose, dextrose, molasses, corn syrup, "wood juice"; and to the fermentation of pure starchy materials.

While butyl alcohol and acetone have been produced for years past by the fermentation of some carbohydrate materials, attempts to ferment carbohydrates free from or deficient in nitrogenous material by butyl-forming bacilli, have given unsatisfactory results for the reason that the carbohydrates, if fermented at all, gave very poor yields of butyl alcohol and acetone.

I have found that butyl-forming bacilli will not remain active in a carbohydrate media, containing no protein material, for the reason that the nitrogenous nutrients necessary to their life function, are absent. In a purely saccharine media such as is presented by a glucose solution, or in a starch media, nitrogenous matter is absent, whereas in commercial molasses or "black strap" the nitrogenous materials required for butyl fermentation are sometimes, but not always, present.

The object of my invention is to provide a suitable process for the economical utilization of protein-free carbohydrates in the production of butyl alcohol and acetone, and I attain this object by mixing soluble nitrogenous nutrients with the carbohydrate mash before inoculating it with a culture of butyl-forming bacilli.

In the manufacture of various corn products such as starch, oil, gluten, and oil-cake, it has for years been the practice to disintegrate the maize kernels by digesting them with weak sulfurous acid or other acid solutions, whereby the various portions of the kernel are loosened and may be easily separated.

During this steeping process some of the protein is decomposed, partly by the acid present and partly by the enzymes or bacteria present in the corn, and as a result of this hydrolysis the solution retains certain water-soluble nitrogenous bodies derived from corn protein. This sulfurous acid solution, after concentration to a specific gravity corresponding to 22-30° Baumé scale, is known as "concentrated steep water", and has the following approximate composition:—

| | Per cent. |
|---|---|
| Water | 55-65 |
| Soluble nitrogenous material | 22-17 |
| Ash | 10-7 |
| Non-nitrogenous extract | 10 |
| Acid | 3-4 |
| Sulfur dioxide | 0.1-0.2 |

I have found that steep water, which in the past has been a waste product, can be employed to great advantage in the fermentation of carbohydrates for the production of butyl alcohol and acetone.

I have discovered that carbohydrates free from or deficient in protein may be satisfactorily fermented in the presence of "steep water", with the production of good yields of butyl alcohol and acetone, and it would thus appear that the soluble nitrogenous matter contained in steep water is of such a character that it is readily utilized as a source of nitrogen by the butyl bacilli.

As suitable carbohydrates for use in my process I may employ, for example, glucose, lactose, molasses, saccharose, "wood juice" containing pentose sugars, "hydrol syrup" such as is obtained by the saccharification of starch, or starch, per se.

While my invention is applicable to the utilization of protein-free or protein-deficient carbohydrates generally, I shall give but one example—i. e.—the fermentation of "hydrol syrup".

Hydrol syrup has the following approximate composition:—

| | Per cent. |
|---|---|
| Dextrose | 55 |
| Dextrine | 18 |
| Water | 27 |

In my improved process for the production of butyl alcohol and acetone by the fermentation of protein-free carbohydrates by means of butyl-forming bacilli I may proceed as follows. A solution of the following composition is prepared.

| | Per cent. |
|---|---|
| Hydrol | 5–8 |
| Concentrated steep water | 0.5–3.0 |
| Water | 94–89 |

The solution is preferably sterilized by heating under about twenty pounds steam pressure for about one hour, after which it is cooled to 98° F. and inoculated with a culture of butyl-forming bacilli contained in a suitable media—as for example, 5% corn meal mash. The fermentation is allowed to proceed to completion after which the butyl alcohol and acetone are recovered and separated by distillation in the usual manner. The yield of butyl alcohol and acetone obtained is equivalent to about 18–23% by weight of the hydrol employed.

In carrying out my process I prefer to use the heat-resisting butyl bacilli described by Weizmann in his United States Patent 1,315,585 of September 9, 1919, though my process is equally applicable to other butyl bacilli.

I have found that while the presence of acid and sulfur dioxide in the concentrated steep water might be expected to have a deleterious effect on the fermentation—no such effect is observed.

While in the example cited above for the fermentation of "hydrol syrup" I have indicated a suitable mash concentration of five to eight per cent, it should be made clear that my invention is not so limited. Mashes containing less than five per cent of carbohydrates may be fermented in accordance with my invention and process but the dilution of the mash makes the process less economical. On the other hand, some carbohydrates may be employed in my process in mash concentrations above eight per cent, the exact upper limit of concentration varying with the carbohydrate material employed.

While in the example given above I have indicated that the proportion of "steep water" employed may vary from five tenths per cent to three per cent of the mash, it should be understood that a larger proportion may, sometimes, be employed with good result. I prefer to use one per cent.

Now having fully described my invention, I claim the following as new and novel:—

1. A fermentation process which consists in preparing a mash containing protein-free carbohydrates and soluble nitrogenous matter derived from maize, inoculating the mash with butyl-acetonic bacilli, allowing fermentation to proceed, and recovering butyl alcohol and acetone from the fermented mash.

2. A fermentation process which consists in preparing a mash containing protein-deficient carbohydrates and soluble nitrogenous matter derived from maize, inoculating the mash with butyl-acetonic bacilli, allowing fermentation to proceed, and recovering butyl alcohol and acetone from the fermented mash.

3. A fermentation process which consists in preparing a mash containing protein-free carbohydrates and concentrated steep water, inoculating the mash with butyl-acetonic bacilli, allowing fermentation to proceed, and recovering butyl alcohol and acetone from the fermented mash.

4. A fermentation process which consists in preparing a mash of protein-deficient carbohydrate and concentrated steep water, inoculating the mash with butyl-acetonic bacilli, allowing fermentation to proceed, and recovering butyl alcohol and acetone from the fermented mash.

5. A fermentation process which consists in preparing a sterilized mash of protein-free carbohydrate and soluble nitrogenous matter derived from maize, inoculating the mash with butyl-acetonic bacilli, allowing fermentation to proceed, and recovering butyl alcohol and acetone from the fermented mash.

6. A fermentation process which consists in preparing a sterilized mash of protein-deficient carbohydrate and soluble nitrogenous matter derived from maize, inoculating the mash with butyl-acetonic bacilli, allowing fermentation to proceed, and recovering butyl alcohol and acetone from the fermented mash.

7. A fermentation process which consists in preparing a sterilized mash of protein-free carbohydrate and soluble nitrogenous matter derived from maize, inoculating the mash at about 98° F, with butyl-acetonic bacilli, allowing fermentation to proceed, and recovering butyl alcohol and acetone from the fermented mash.

8. A fermentation process which consists in preparing a sterilized mash of protein-deficient carbohydrate and soluble nitrogenous matter derived from maize, inoculating the mash at about 98° F. with butyl-acetonic bacilli, allowing fermentation to proceed, and recovering butyl alcohol and acetone from the fermented mash.

9. A fermentation process which consists in preparing a sterilized mash of protein-free carbohydrate and concentrated steep water, inoculating the mash at about 98° F. with butyl-acetonic bacilli, allowing fermentation to proceed, and recovering butyl alcohol and acetone from the fermented mash.

10. A fermentation process which consists in preparing a sterilized aqueous mash comprising 5–8% of protein-free carbohydrate and 0.5–3.0% of a 50% mixture of water and soluble nitrogenous matter derived from maize, inoculating the mash at about 98° F. with butyl-acetonic bacilli, allowing fermentation to proceed, and recovering butyl alcohol and acetone from the fermented mash.

11. A fermentation process which consists in preparing a sterilized aqueous mash comprising 5-8% of protein-deficient carbohydrate and 0.5-3.0% of concentrated steep water, inoculating the mash at about 98° F. with butyl-acetonic bacilli, allowing the fermentation to proceed, and recovering butyl alcohol and acetone from the fermented mash.

12. In a fermentation process for the production of butyl alcohol and acetone, the step which consists in preparing a mash of saccharine carbohydrate and soluble nitrogenous matter derived from maize.

13. In a fermentation process for the production of butyl alcohol and acetone, the step which consists in preparing a mash of saccharine carbohydrate and concentrated steep water.

DAVID A. LEGG.